(12) United States Patent
 Yakabe

(10) Patent No.: US 11,048,050 B2
(45) Date of Patent: Jun. 29, 2021

(54) METHOD FOR MANUFACTURING OPTICAL CONNECTOR

(71) Applicant: SUMITOMO ELECTRIC INDUSTRIES, LTD., Osaka (JP)

(72) Inventor: Sho Yakabe, Osaka (JP)

(73) Assignee: SUMITOMO ELECTRIC INDUSTRIES, LTD., Osaka (JP)

(*) Notice: Subject to any disclaimer, the term of this patent is extended or adjusted under 35 U.S.C. 154(b) by 0 days.

(21) Appl. No.: 16/762,598

(22) PCT Filed: Aug. 9, 2018

(86) PCT No.: PCT/JP2018/029948
 § 371 (c)(1),
 (2) Date: May 8, 2020

(87) PCT Pub. No.: WO2019/106891
 PCT Pub. Date: Jun. 6, 2019

(65) Prior Publication Data
 US 2020/0310045 A1    Oct. 1, 2020

(30) Foreign Application Priority Data

Nov. 29, 2017  (JP) .............................. JP2017-229485

(51) Int. Cl.
 *G02B 6/38* (2006.01)
 *G02B 6/30* (2006.01)
 *G02B 6/40* (2006.01)

(52) U.S. Cl.
 CPC ............. *G02B 6/3882* (2013.01); *G02B 6/30* (2013.01); *G02B 6/3826* (2013.01); *G02B 6/40* (2013.01)

(58) Field of Classification Search
 None
 See application file for complete search history.

(56) References Cited

U.S. PATENT DOCUMENTS

| 6,104,856 A | 8/2000 | Lampert |
| 2019/0049668 A1* | 2/2019 | Yakabe ................ G02B 6/3885 |

FOREIGN PATENT DOCUMENTS

| JP | H04-079308 U | 7/1992 |
| JP | 2004-145140 A | 5/2004 |
| JP | 2017-173539 A | 9/2017 |
| JP | 2017-203897 A | 11/2017 |
| WO | 2017/138571 A1 | 8/2017 |
| WO | 2017/163478 A1 | 9/2017 |

* cited by examiner

*Primary Examiner* — Chad H Smith
(74) *Attorney, Agent, or Firm* — Oliff PLC

(57) ABSTRACT

A method for manufacturing an optical connector includes a ferrule configured to retain a plurality of optical fibers and the steps of: exposing tip end faces of the plurality of optical fibers to an end face of the ferrule to fix the plurality of optical fibers to the ferrule; polishing the end face together with the tip end faces; positioning an adhesive film containing a material different from the material of the ferrule to the end face in a layered film having a plurality of films; and welding, to the ferrule, a spacer film containing a material the same as the material of the ferrule in the layered film.

4 Claims, 12 Drawing Sheets

METHOD FOR MANUFACTURING OPTICAL CONNECTOR

TECHNICAL FIELD

An aspect of the present disclosure relates to a method for manufacturing an optical connector.

The present application claims the benefit of priority based on Japanese Patent Application No. 2017-229485 filed with the Japan Patent Office on Nov. 29, 2017, the entire contents of which are hereby incorporated by reference.

BACKGROUND ART

Patent Literature 1 describes an optical connector and an optical coupling structure. This optical connector includes a ferrule having a ferrule end face opposite to a counterpart optical connector and a spacer that is provided on the ferrule end face and that defines a gap between the ferrule end face and the counterpart connector. The spacer is joined to the ferrule end face with a first plate-shaped jig, an elastic jig, an optical mask, and a second plate-shaped jig. The opposing surface of the spacer opposite to the ferrule end face has a first region that is joined to the ferrule end face and a second region that is not joined to the ferrule end face.

In the work that joins the spacer, the first plate-shaped jig, the elastic jig, the optical mask, and the second plate-shaped jig are placed on the spacer in this order, and a laser light beam is applied from the second plate-shaped jig to the spacer to weld the spacer and the ferrule end face to each other. At this time, since the optical mask protects a second region in the spacer, the laser light beam is not applied to the second region. Consequently, since the initial thickness of the spacer is reserved in the second region in the spacer, the gap between the ferrule end face and the counterpart connector is accurately defined.

CITATION LIST

Patent Literature

Patent Literature 1: Japanese Unexamined Patent Publication No. 2017-173539

SUMMARY OF INVENTION

A method for manufacturing an optical connector according to an aspect of the present disclosure is a method for manufacturing an optical connector including a ferrule configured to retain a plurality of optical fibers, the method including the steps of: exposing tip end faces of the plurality of optical fibers from an end face of the ferrule to fix the plurality of optical fibers to the ferrule; polishing the end face together with the tip end faces; positioning a first film having a material different from a material of the ferrule to the end face in a layered film having a plurality of films; and welding a second film containing a material equal to the material of the ferrule to the end face in the layered film.

DESCRIPTION OF EMBODIMENTS

Problem to be Solved by the Present Disclosure

Figure 11:
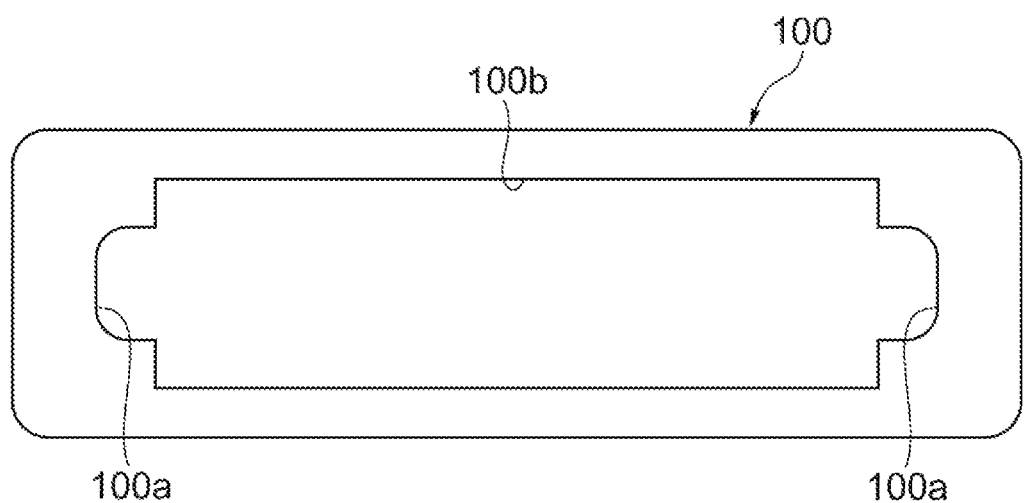
FIG. 11 is a diagram showing a previously existing spacer film.
Figure 12:
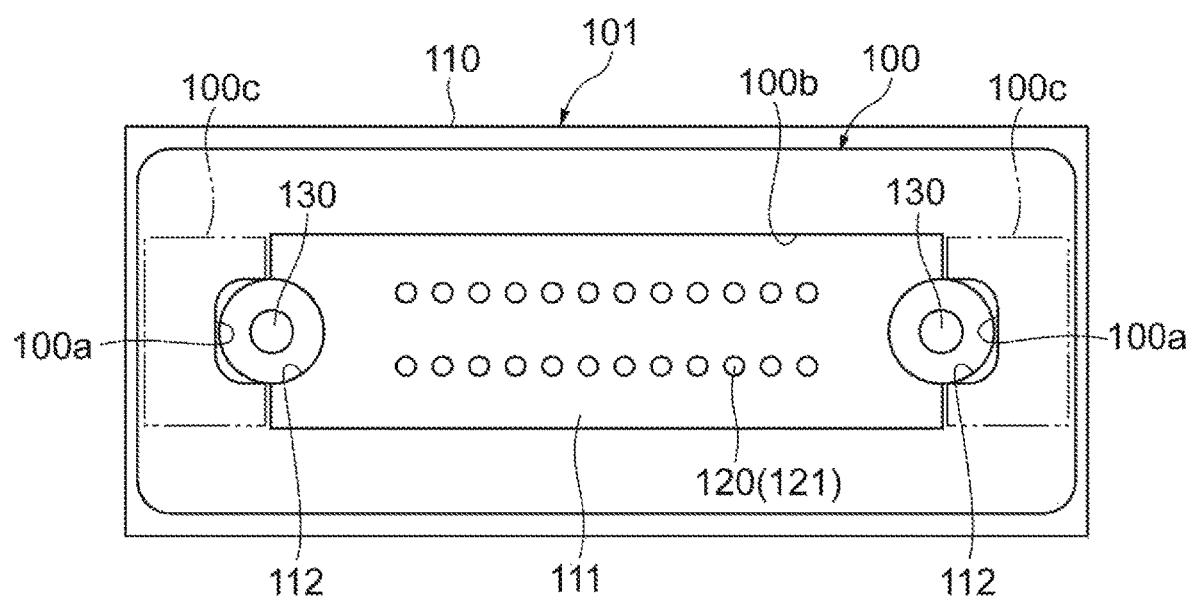
FIG. 12 is a diagram showing the previously existing spacer film and an optical connector.

As shown in FIGS. 11 and 12, as a spacer that is joined by the application of a laser light beam, a spacer film 100 having a pair of positioning shapes 100a is known. The spacer film 100 is in a frame shape having an opening 100b from which an end face 111 of a ferrule 110 of an optical connector 101 and tip end faces 121 of optical fibers 120 of the optical connector 101 are exposed.

On the inner edge of opening 100b, the pair of positioning shapes 100a is provided. The positioning shape 100a is in a recessed shape that is recessed on both sides such that a guide hole 112, into which a positioning guide pin 130 is inserted, is entirely exposed. The spacer film 100 is positioned to the ferrule 110 by fitting the positioning shapes 100a to the guide pins 130 that are inserted into the guide holes 112. A laser light beam is applied to the positioned spacer film 100, and thus the spacer film 100 and the ferrule 110 are welded to each other.

In the case where a laser light beam is applied to the spacer film 100 entirely, more specifically when a laser light beam is applied to the area near the positioning shape 100a, a problem possibly arises that the laser light beam is applied to the guide hole 112 to melt the inner surface of the guide hole 112. In order to avoid melting the inner surface of the guide hole 112, it is thought that no laser light beam is applied to the periphery of the positioning shape 100a.

However, in the case where no laser light beam is applied to the periphery of the positioning shape 100a, a non-welded part 100c is formed in the area near the guide hole 112. When the non-welded part 100c is wiped due to cleaning the optical connector 101, for example, a turn-up or a peel sometimes occurs from the end face 111. When a turn-up or a peel occurs in the spacer film 100, there is a concern that the reliability of defining the gap by the spacer film 100 is reduced. Accordingly, it is demand to suppress a film turn-up and a film peel after the film is joined to the end face of the ferrule.

An object of the present disclosure is to provide a method for manufacturing an optical connector that can suppress a film turn-up and a film peel.

Advantageous Effects of Invention

According to an aspect of the present disclosure, a film turn-up and a film peel can be suppressed.

Description of Embodiments

First, the content of embodiments of the present disclosure will be described in enumeration. A method for manufacturing an optical connector according to an embodiment is a method for manufacturing an optical connector including a ferrule configured to retain a plurality of optical fibers, the method including the steps of: exposing tip end faces of the plurality of optical fibers to an end face of the ferrule to fix the plurality of optical fibers to the ferrule; polishing the end face together with the tip end faces; positioning a first film having a material different from a material of the ferrule to the end face in a layered film having a plurality of films; and welding a second film containing a material the same as the material of the ferrule to the end face in the layered film.

In this method for manufacturing an optical connector, the layered film is positioned to the end face using the first film made of a material different from the material of the ferrule in the layered film. The second film containing a material the same as the material of the ferrule in the layered film is welded to the end face of the ferrule, and thus the second film is joined to the ferrule. As described above, the layered film is positioned using the first film, and thus the positioning shape can be omitted from the second film that is welded. Therefore, forming a non-welded part on the second film can be avoided. As a result, the laser light beam is applied to the second film such that no non-welded part is formed, and thus a turn-up and a peel in the second film can be suppressed, even though the second film is wiped due to cleaning. A turn-up and a peel in the second film that functions as a spacer can be suppressed, and thus degradation in the reliability of defining the gap with the second film can be suppressed. Moreover, the positioning shape can be omitted from the second film, and thus the degree of freedom of the shape of the second film can be improved. Since the first film that performs positioning is made of a material different from the material of the ferrule, the first film is not easily welded to the ferrule even though a laser light beam is applied. Consequently, the first film can be removed from the second film and the ferrule after the second film is welded to the ferrule.

In the step of positioning, positioning may be performed using pins provided on a jig that retains the ferrule and a shape of the first film. In this case, positioning using the first film can be performed using the pins on the jig that is provided separately from the ferrule. Consequently, positioning can be performed by fitting the first film to the pins on the jig without inserting guide pins to the guide holes of the ferrule, and thus positioning the layered film can be easily and highly accurately performed.

The ferrule may have a plurality of guide holes into which a guide pin is inserted, and in the step of positioning, positioning may be performed using a plurality of the guide pins that is inserted into the plurality of guide holes and a shape of the first film. In this case, the first film is fit to the guide pins that are inserted into the guide holes, and thus positioning the first film can be performed. Therefore, positioning the layered film can be highly accurately performed without using the above-described jig.

The above-described method for manufacturing an optical connector may include the steps of: removing the first film from the second film after the step of welding; and AR-coating the end face and the tip end face. In this case, the first film is removed before the end face of the ferrule and the tip end face of the optical fiber are AR-coated. Therefore, before AR coating, the first film is caused to protect the second film, the end face of the ferrule, and the tip end face of the optical fiber. Consequently, cleaning the end face and the tip end face after the first film is removed can be omitted.

The first film may be an adhesive film having an adhesion property on a surface on a side where the second film is located. In this case, the first film is adhered to the second film. Therefore, in positioning the first film to the ferrule and in welding the second film, the displacement of the first film from the second film can be suppressed.

Detail of Embodiments

In the following, specific examples of a method for manufacturing an optical connector according to embodiments will be described with reference to the drawings. The present disclosure is not limited to exemplifications below, and is to include all modifications described in claims and in the scope equivalent to claims. In the description of the drawings, the same or corresponding components are designated with the same reference signs, and the duplicate description is appropriately omitted. For easy understanding, the drawings are partially simplified or exaggerated, and dimensions and any other parameters are not limited to ones described in the drawings.

First Embodiment

Figure 1:
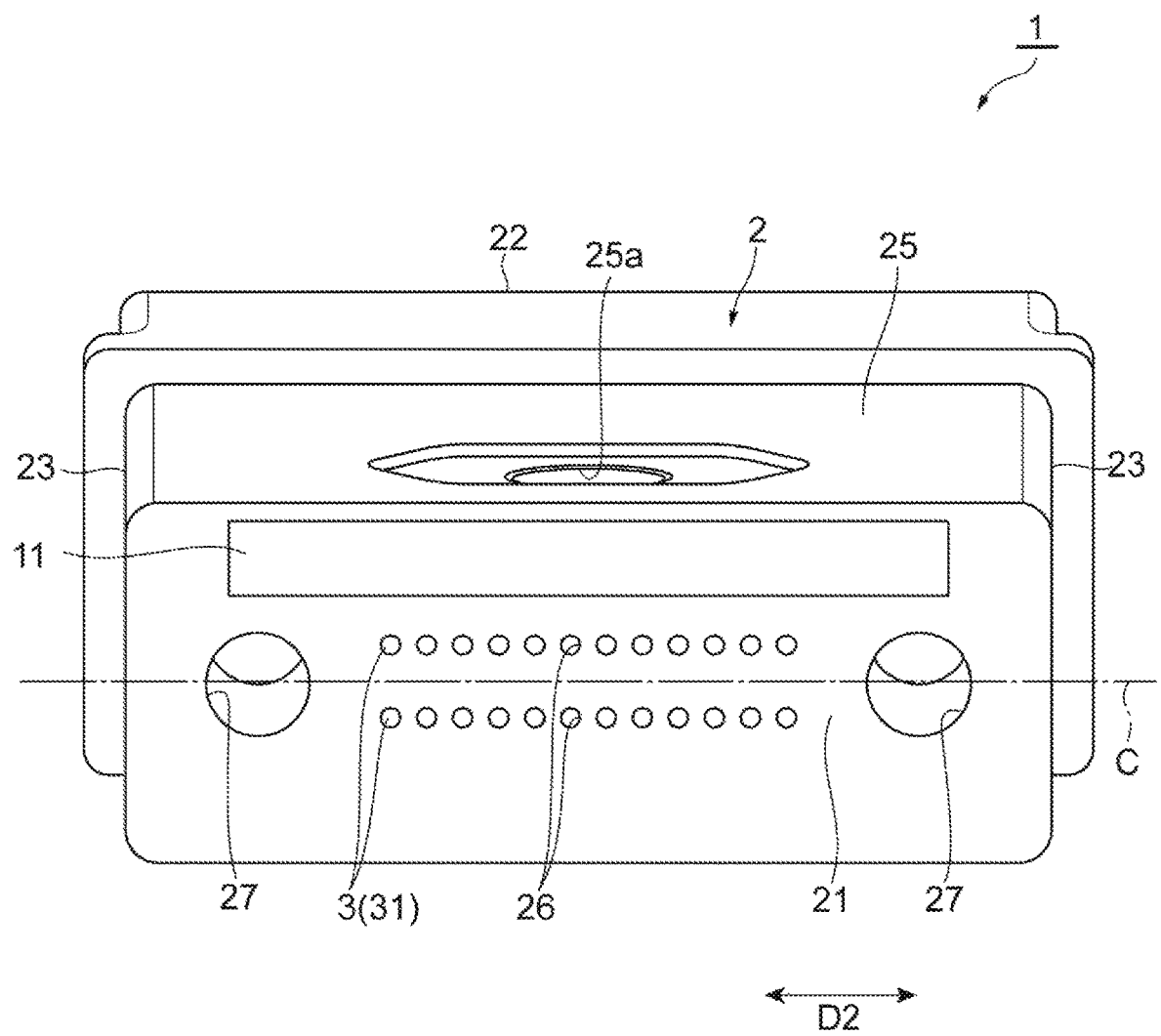
FIG. 1 is a perspective view showing an optical connector according to a first embodiment.
Figure 2:
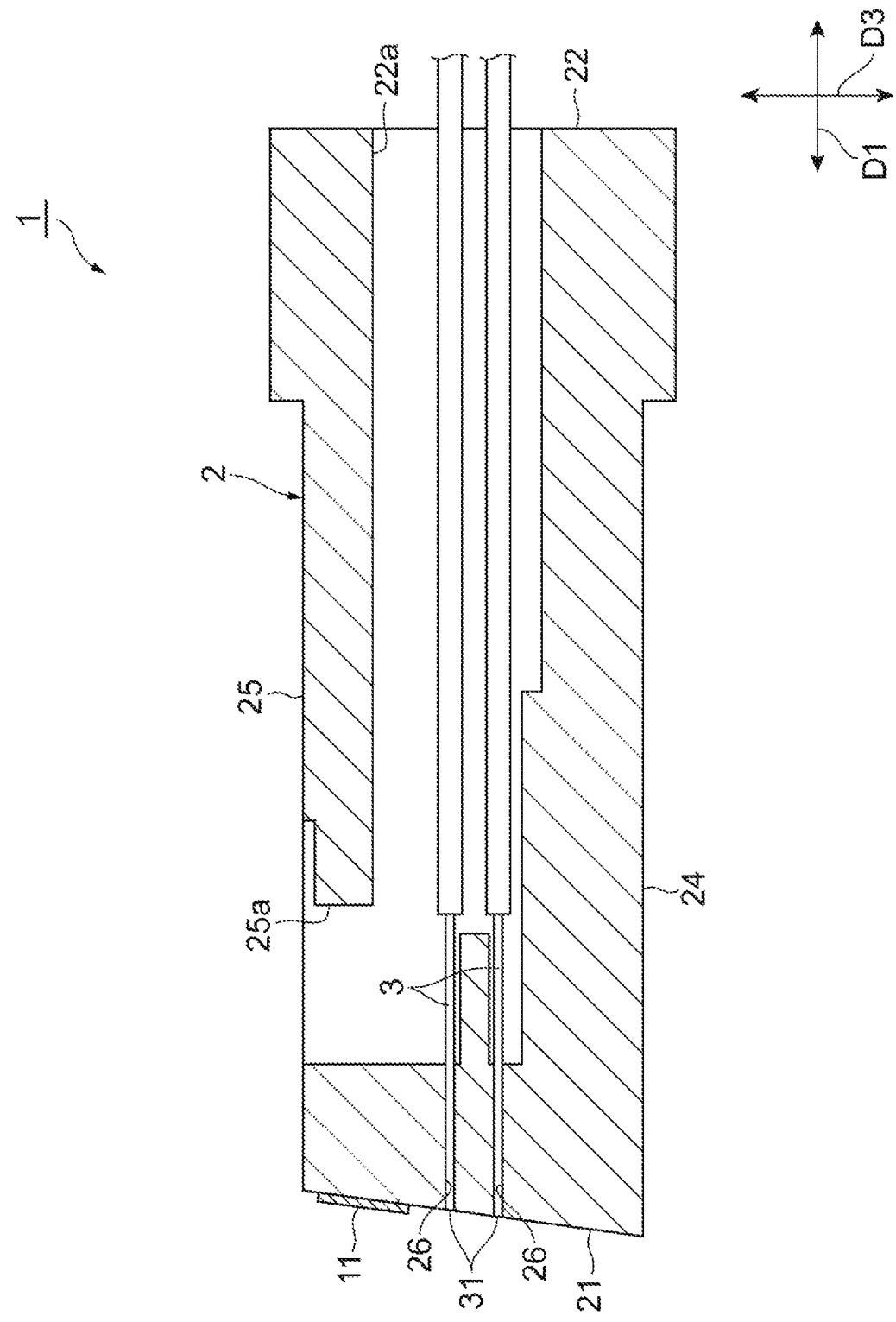
FIG. 2 is a cross-sectional side view showing the optical connector in FIG. 1.

FIG. 1 is a perspective view showing an optical connector 1 according to a first embodiment. FIG. 2 is a cross-sectional side view showing the optical connector 1. As shown in FIGS. 1 and 2, the optical connector 1 includes a ferrule 2 and an optical fiber 3. The optical connector 1 is connected to a counterpart connector, for example, having a configuration similar to the configuration of the optical connector 1 in a connection direction D1. For example, the ferrule 2 is made of a material having glass included in a resin, such as polyphenylene sulfide (PPS). The principal component of the material of the ferrule 2 is PPS. The ferrule 2 has an end face 21 that is provided on one end in the connection direction D1 and opposite to the counterpart connector, a rear end face 22 that is provided on the other end in the connection direction D1, a pair of side faces 23 that extends along the connection direction D1, a bottom face 24, and a top face 25.

On the rear end face 22, an inlet port 22a that accepts a plurality of optical fibers 3 is formed. The plurality of optical fibers 3 is introduced in a form of a 0.25 mm optical fiber, 0.9 mm coated optical fiber, coated tape optical fiber, or any other form, for example. On the top face 25, a hole part 25a that enables visual recognition of the optical fibers 3 in the inside of the ferrule 2 is forming. The hole part 25a is an introduction hole for an adhesive. Consequently, an adhesive is introduced from the hole part 25a into the inside of the ferrule 2 in the state in which the optical fibers 3 are disposed in the inside of the ferrule 2, and thus the optical fibers 3 are adhered and fixed in the inside of the ferrule 2.

The ferrule 2 has a plurality of optical fiber retention holes 26 on which the optical fibers 3 are retained, and a pair of guide holes 27 into which a guide pin that positions the optical connector 1 to the counterpart connector is inserted. The optical fiber retention holes 26 and the guide holes 27 are opened on the end face 21 of the ferrule 2, and extend from the end face 21 to the inside of the ferrule 2. The pair of guide holes 27 is disposed along a direction D2 that intersects with the connection direction D1. The direction D2 is a direction orthogonal to the connection direction D1, for example, and is the longitudinal direction of the end face 21, and is a orthogonal to the side face 23. The pair of guide holes 27 is disposed on both end sides of a tip end face 31 of the optical fiber 3 in the direction D2.

The plurality of optical fibers 3 is individually inserted into the optical fiber retention holes 26, and retained on the optical fiber retention holes 26. For example, the optical fiber 3 is a single-mode fiber. However, the optical fiber 3 may be a multimode fiber. The plurality of optical fiber retention holes 26 penetrates from the inlet port 22a to the end face 21. The optical fiber retention holes 26 penetrate in the connection direction D1. For example, the center axis directions of the optical fiber retention holes 26 and the optical axis directions of the optical fibers 3 are both matched with the connection direction D1. The tip end faces 31 of the plurality of optical fibers 3 are arranged on the end face 21 along the direction D2. A set of the plurality of tip end faces 31 that is arranged in a line is arranged in two rows along a direction D3 that intersects with the direction D2, for example. The direction D3 is a direction orthogonal to the top face 25, for example. The connection direction D1, the direction D2, and the direction D3 are orthogonal to each other, for example.

The tip end faces 31 of the optical fibers 3 are flush with the end face 21, for example. In a cross section along the optical axis of the optical fiber 3, the normal direction of the tip end face 31 of the optical fiber 3 is inclined to the center axis direction of the optical fiber retention hole 26, i.e., to the optical axis direction of the optical fiber 3. This tilt angle is 8° or more and 20° or less, for example. On the end face 21, the tip end faces 31 are disposed at regular intervals, for example. The set of the plurality of tip end faces 31 is disposed at positions vertically displaced to a center axis C that passes through the center of the pair of guide holes 27 and extends in the direction D2. At this time, the plurality of tip end faces 31 may be disposed at positions in symmetry to each other to the center axis C. However, in the case where the displacement due to optical refraction or pressing force in connection is taken into account, the plurality of tip end faces 31 may be disposed at positions at which the plurality of tip end faces 31 is not in symmetry to each other to the center axis C. The number of the tip end faces 31 is 24, for example.

Figure 3:
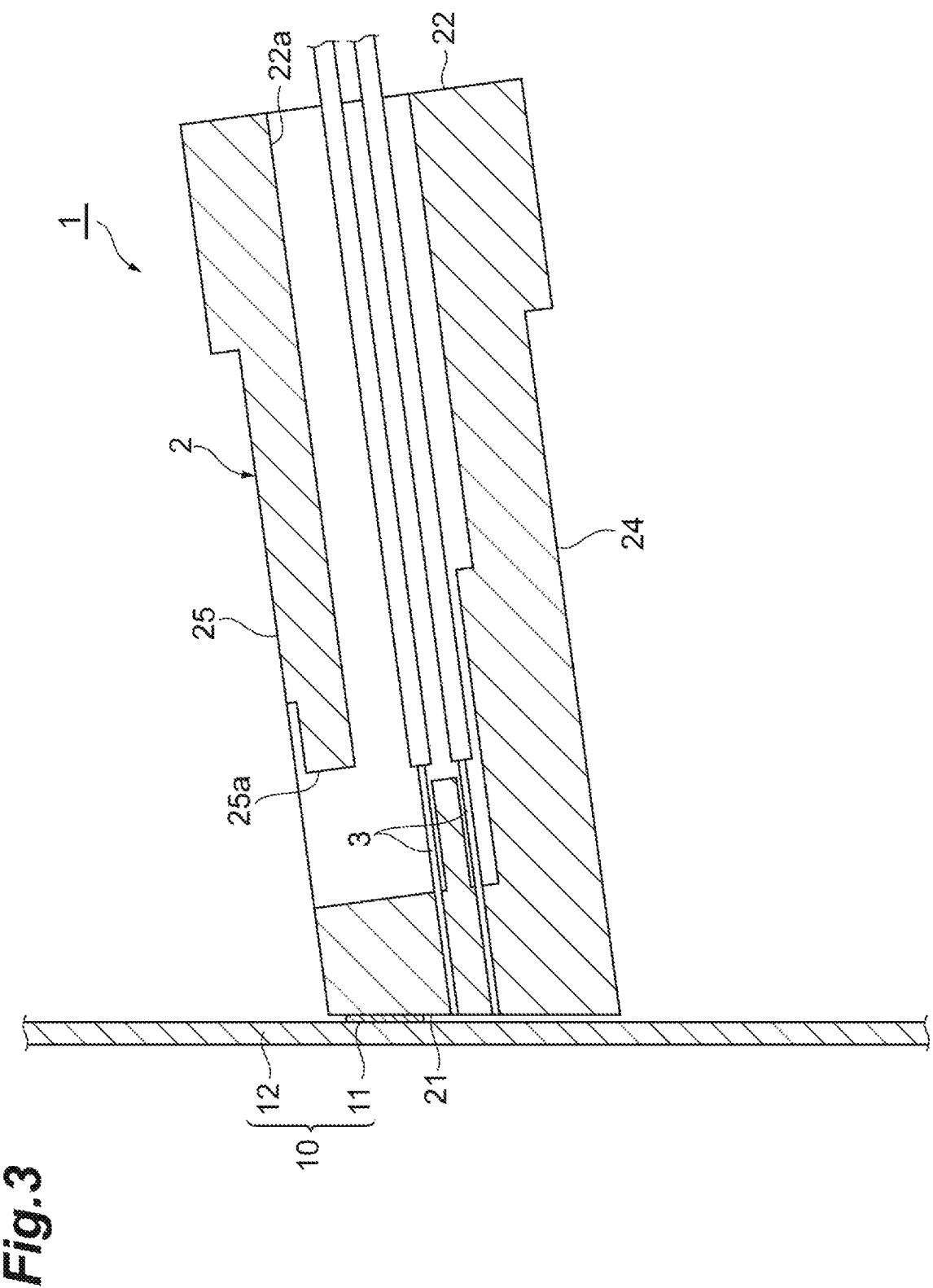
FIG. 3 is a cross-sectional side view showing a layered film and the optical connector according to the first embodiment.
Figure 4:
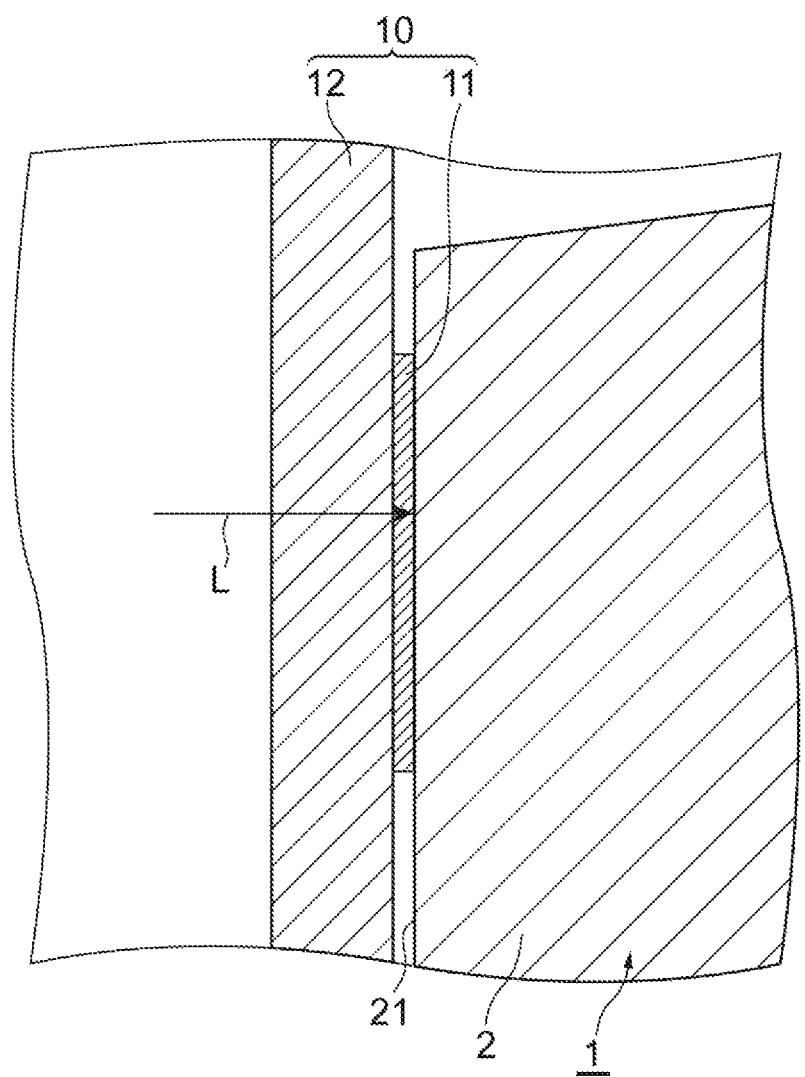
FIG. 4 is an enlarged cross-sectional side view of the layered film and the end face of the optical connector in FIG. 3.

The optical connector 1 further includes a spacer film 11 (second film) that defines the gap between the optical connector 1 and the counterpart connector. FIG. 3 is a cross-sectional side view showing the optical connector 1 to which a layered film 10 having the spacer film 11 and an adhesive film 12 (first film) is attached. FIG. 4 is a cross-sectional side view showing the end face 21, the spacer film 11, and the adhesive film 12 of the optical connector 1 in FIG. 3. The adhesive film 12 has the adhesion properties on the surface on the spacer film 11 side, and is removed from the spacer film 11 when the optical connector 1 is used.

The spacer film 11 is a film formed in a thin-film shape, and is disposed on the end face 21 of the ferrule 2. The thickness of the spacer film 11 is matched with the gap between the optical connector 1 and the counterpart connector, and is 5 µm or more and 200 µm or less, for example. The spacer film 11 is sandwiched between the end face 21 and the ferrule end face of the counterpart connector, and thus defines the gap between the end face 21 and the ferrule end face of the counterpart connector. For example, the spacer film 11 is made of a material containing a material the same as the material of the ferrule 2. The spacer film 11 is made of PPS, for example. That is, the principal component of the material of the spacer film 11 is PPS similarly to the ferrule 2. The spacer film 11 is welded to the end face 21 of the ferrule 2 with a laser light beam L.

The spacer film 11 is welded to a part of the end face 21 of the ferrule 2, and is welded at a position at which the spacer film 11 does not overlap the tip end face 31 of the optical fiber 3 (the optical fiber retention hole 26) and the guide hole 27. Therefore, after the adhesive film 12 is removed, the tip end face 31 and the guide hole 27 are exposed. As an example, the spacer film 11 is welded on the top face 25 side (on the upper side) from the optical fiber retention hole 26 and the optical fiber 3. However, the welding position of the spacer film 11 is appropriately changeable as long as the welding position is located at which the spacer film 11 does not overlap the tip end face 31 and the guide hole 27. The shape and size of the spacer film 11 are also appropriately changeable.

The adhesive film 12 is provided for positioning the layered film 10 to the end face 21 of the ferrule 2. Consequently, the spacer film 11 does not have the shape (positioning shape) for positioning the layered film 10. The adhesive film 12 is made of a material different from the materials of the ferrule 2 and the spacer film 11, and is made of a material other than PPS, for example. The material of the adhesive film 12 is polyethylene terephthalate (PET), for example.

The adhesive film 12 is made of a material that transmits the laser light beam L for welding the spacer film 11 and that is not welded to the ferrule 2. The thickness of the adhesive film 12 is thicker than the thickness of the spacer film 11. The adhesive film 12 having a thickness and the spacer film 11 are attached to the end face 21, and thus attachment can be easily performed, compared with the case where the spacer film 11 is attached in a single item. More specifically, in the case where the spacer film 11 is attached in a single item, the thin spacer film 11 has to be picked up with tweezers or any other tools for attachment. To this, in the layered film 10 including the adhesive film 12 and the spacer film 11, attachment can be performed without using tweezers or any other tools.

Figure 5:
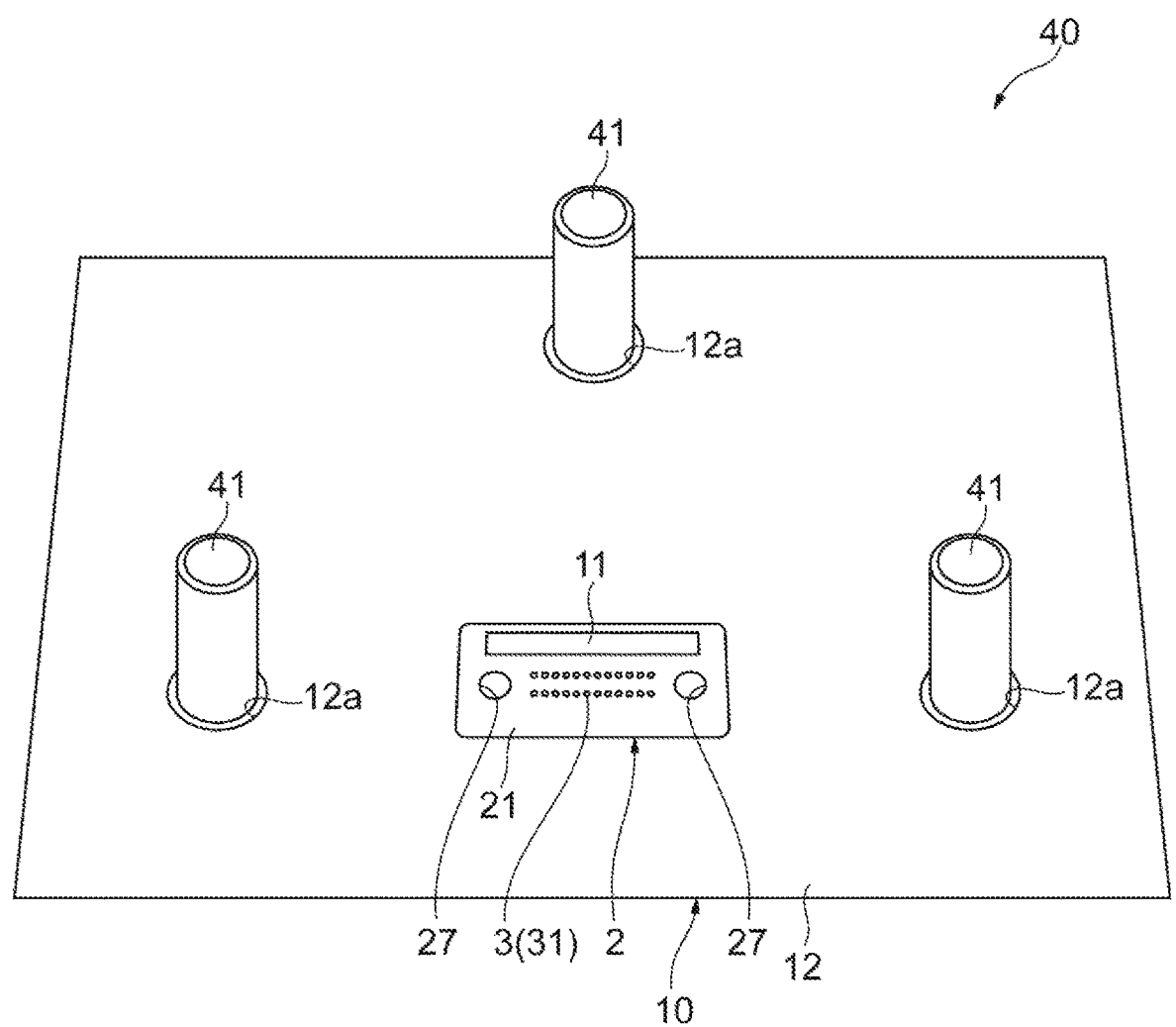
FIG. 5 is a perspective view showing a state in which the layered film is positioned on a jig that retains the ferrule of the optical connector in FIG. 1.
Figure 6:
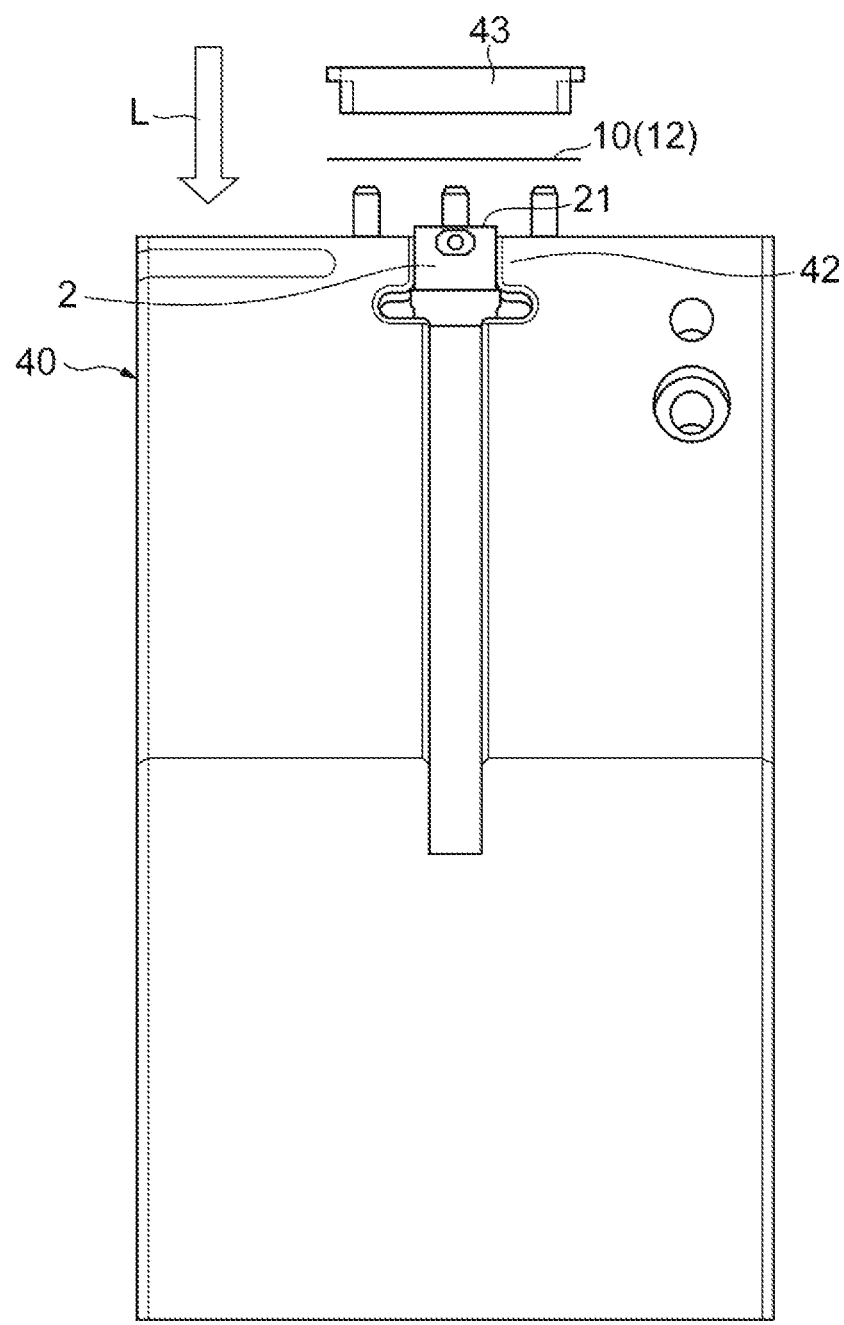
FIG. 6 is a side view showing the jig in FIG. 5.
Figure 7:
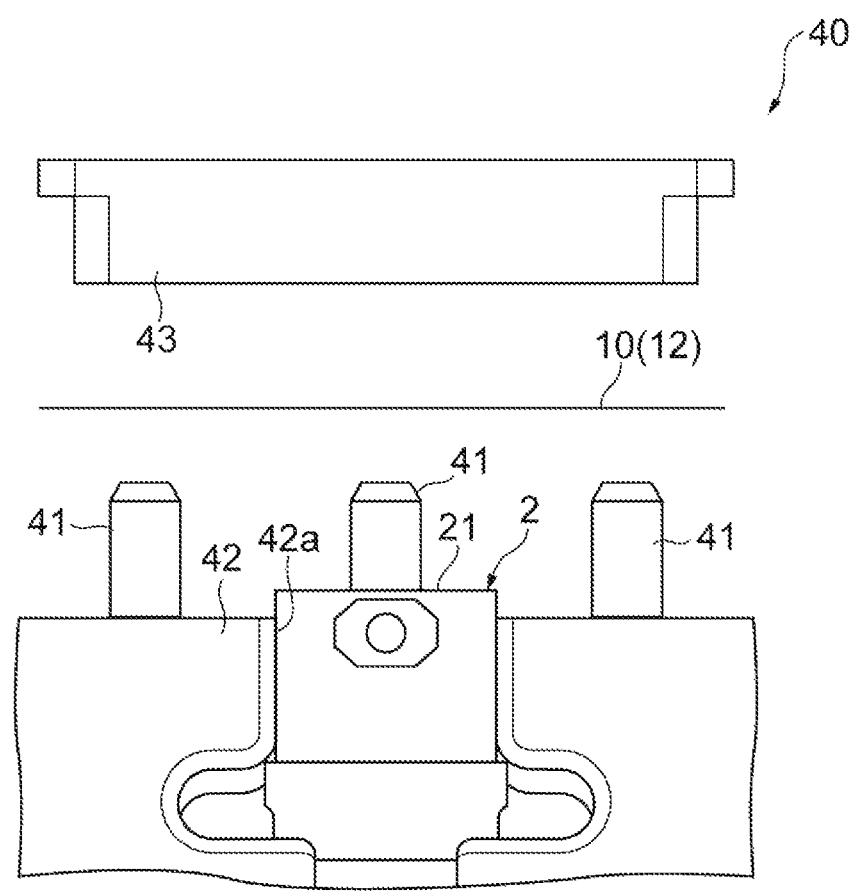
FIG. 7 is an enlarged side view of the jig, the ferrule, and the layered film in FIG. 5.

FIG. 5 is a perspective view of the adhesive film 12 viewed from above. FIG. 6 is a side view showing a jig 40 that retains the ferrule 2. FIG. 7 is an enlarged side view of a place where the jig 40 retains the ferrule 2. The jig 40 is a laser welding jig that applies the laser light beam L to the end face 21 of the ferrule 2 for laser welding in the state in which the ferrule 2 is retained. The jig 40 includes, for example, three pins 41 that protrude above, a retaining unit 42 that retains the ferrule 2, and a glass plate 43 that is provided above the pins 41 and the retaining unit 42. The retaining unit 42 retains the ferrule 2 in the state in which the end face 21 is directed above. The retaining unit 42 has a recess 42a into which the ferrule 2 is fit, the ferrule 2 is fit into the recess 42a, and thus the ferrule 2 is retained on the jig 40.

For example, the three pins 41 are disposed so as to four an isosceles triangle shape. The ferrule 2 is retained among the three pins 41, specifically retained in the area near the base of the three pins 41 that form an isosceles triangle shape. The adhesive film 12 of the layered film 10 that is attached to the retained ferrule 2 includes a through hole 12a into which the pin 41 is inserted as a positioning shape. Therefore, the pins 41 of the jig 40 are inserted into the through holes 12a, and thus the layered film 10 is positioned to the ferrule 2.

Figure 8:
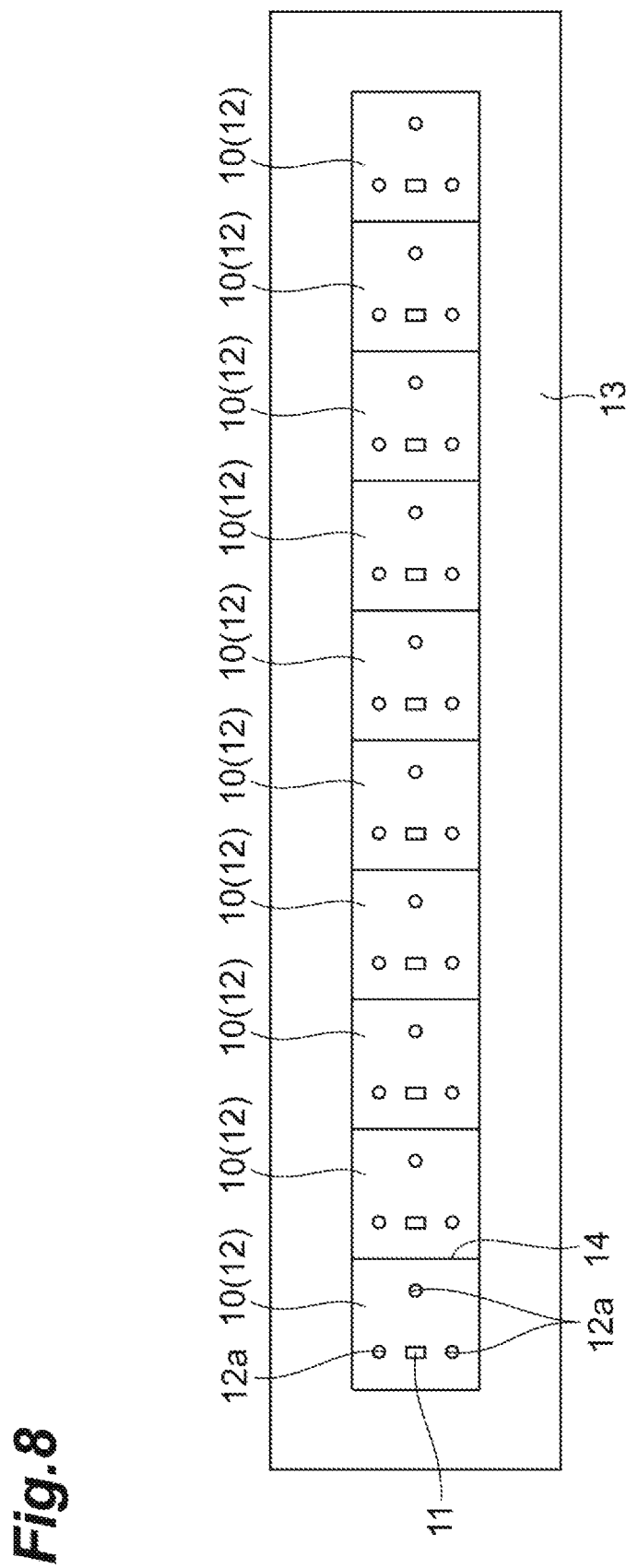
FIG. 8 is a plan view showing an example of the initial state of the layered film.

A method for manufacturing the optical connector 1 using the layered film 10 having the spacer film 11 and the adhesive film 12 thus configured will be described. FIG. 8 is a plan view showing the initial state of the layered film 10. In the initial state, a plurality of layered films 10 is put together through perforations 14, and the plurality of layered films 10 is covered with a surface protective film 13. The surface protective film 13 is provided to prevent the adhesive film 12 from being exposed in the initial state. For example, the material of the surface protective film 13 is the same as the material of the adhesive film 12. For example, and the surface protective film 13 is made of PET. First, the surface protective film 13 is removed, the perforation 14 is broken, and one sheet of the layered film 10 is cut.

The plurality of optical fibers 3 is individually inserted from the inlet port 22a on the rear end face 22 of the ferrule 2 into the optical fiber retention holes 26, and the plurality of optical fibers 3 is protruded from the end face 21. At this time, the optical fiber 3 is inserted into the optical fiber retention hole 26 to expose the optical fiber 3 from the end face 21, the adhesive is introduced into the hole part 25a of the ferrule 2, and the optical fiber 3 is fixed to the ferrule 2 (the step of fixing the optical fiber).

The part protruding from the end face 21 of the optical fiber 3 is cut, and the end face 21 is polished together with the tip end faces 31 of the optical fiber 3. More specifically, for example, the end face 21 and the tip end face 31 are rubbed along a polishing paper sheet supported by a plate member to polish the end face 21 and the tip end face 31 (the step of polishing).

After the end face 21 and the tip end face 31 are polished, as shown in FIG. 5, the ferrule 2 is retained on the jig 40, and one sheet of the layered film 10 is attached to the end face 21 of the ferrule 2. At this time, the spacer film 11 of the layered film 10 is brought into contact with the end face 21, and the adhesive film 12 is positioned to the end face 21. More specifically, positioning is performed using the pins 41 of the jig 40 and the shape of the adhesive film 12, for example, and the pins 41 are inserted into the through holes 12a on the adhesive film 12 for positioning (the step of positioning). Note that the positioning shape of the adhesive film 12 is not limited to the through hole 12a, which is appropriately changeable.

After the layered film 10 is positioned to the end face 21 using the adhesive film 12, the laser light beam L is applied from above the adhesive film 12 (from the direction from the outer side of the surface of the adhesive film 12) to weld the spacer film 11 and the end face 21 to each other. At this time, the laser light beam L transmits the adhesive film 12 and the spacer film 11, and reaches the end face 21, the end face 21 and the spacer film 11 are molten with the laser light beam L, and thus the spacer film 11 is welded (the step of welding).

After the spacer film 11 is welded to the end face 21, the adhesive film 12 is removed from the spacer film 11 (the step of removing). The end face 21 and the tip end face 31 are AR-coated (the step of AR-coating). At this time, an anti-reflection film is foisted at least on the tip end face 31, and thus a Fresnel loss that occurs on the tip end face 31 can be reduced.

Next, the operation and effect obtained from the method for manufacturing the optical connector 1 according to the present embodiment will be described. In the method for manufacturing the optical connector 1, the layered film 10 is positioned to the end face 21 using the adhesive film 12 that is made of a material different from the material of the ferrule 2 in the layered film 10. The spacer film 11 containing the same material as the material of the ferrule 2 is welded to the end face 21 of the ferrule 2 in the layered film 10, and thus the spacer film 11 is joined to the ferrule 2. As described above, the layered film 10 is positioned using the adhesive film 12, and thus the positioning shape can be omitted from the spacer film 11 that is welded. Therefore, forming the non-welded part on the spacer film 11 can be avoided. That is, the laser light beam L can be applied such that the entire surface of the spacer film 11 is welded to the end face 21 of the ferrule 2.

As a result, the laser light beam L is applied to the spacer film 11 such that no non-welded part is formed, and thus a turn-up and a peel in the spacer film 11 can be suppressed even though the spacer film 11 is wiped due to cleaning. Since a turn-up and a peel in the spacer film 11 that functions as a spacer can be suppressed, degradation in the reliability of defining the gap with the spacer film 11 can be suppressed.

Moreover, the positioning shape can be omitted from the spacer film 11, and thus the degree of freedom of the shape of the spacer film 11 can be improved. The adhesive film 12 that performs positioning is made of a material different from the material of the ferrule 2, and thus the adhesive film 12 is not easily welded to the ferrule 2 even though the laser light beam L is applied. Consequently, the adhesive film 12 can be removed from the spacer film 11 and the ferrule 2 after the spacer film 11 is welded to the ferrule 2.

In the step of positioning, positioning is performed using the pins 41 provided on the jig 40 that retains the ferrule 2 and the shape of the adhesive film 12. Therefore, positioning can be performed by the adhesive film 12 using the pins 41 of the jig 40 that is provided separately from the ferrule 2. Consequently, since positioning can be performed by fitting the adhesive film 12 to the pins 41 of the jig 40 even though the guide pin is not inserted into the guide hole 27 of the ferrule 2, positioning the layered film 10 can be easily and highly accurately performed.

Unlike the description above, in the case where the guide pin is inserted into the guide hole 27 of the ferrule 2 and the adhesive film is positioned to this guide pin, the guide pin obliquely extends to the application direction of the laser light beam L, possibly resulting in a problem that the guide pin is in a shadow in the application of the laser light beam L. To this, in the case where the adhesive film 12 is fit to the pins 41 of the jig 40 for positioning like the present embodiment, the laser light beam L can be applied in the state in which the guide pin is not inserted, and thus the above problem can be avoided.

The method for manufacturing the optical connector 1 includes the step of removing the adhesive film 12 from the spacer film 11 after the step of welding and the step of AR-coating the end face 21 and the tip end face 31. Consequently, the adhesive film 12 is removed before the end face 21 of the ferrule 2 and the tip end face 31 of the optical fiber 3 are AR-coated. Therefore, before AR coating, the adhesive film 12 is caused to protect the spacer film 11, the end face 21 of the ferrule 2, and the tip end face 31 of the optical fiber 3. Consequently, cleaning the end face 21 and the tip end face 31 after the adhesive film 12 is removed can be omitted.

The adhesive film 12 has the adhesion properties on the surface on the spacer film 11 side. That is, the adhesive film 12 is adhered to the spacer film 11. Therefore, in positioning the adhesive film 12 to the ferrule 2 and in welding the spacer film 11, the displacement of the adhesive film 12 from the spacer film 11 can be suppressed.

Second Embodiment

Figure 9:
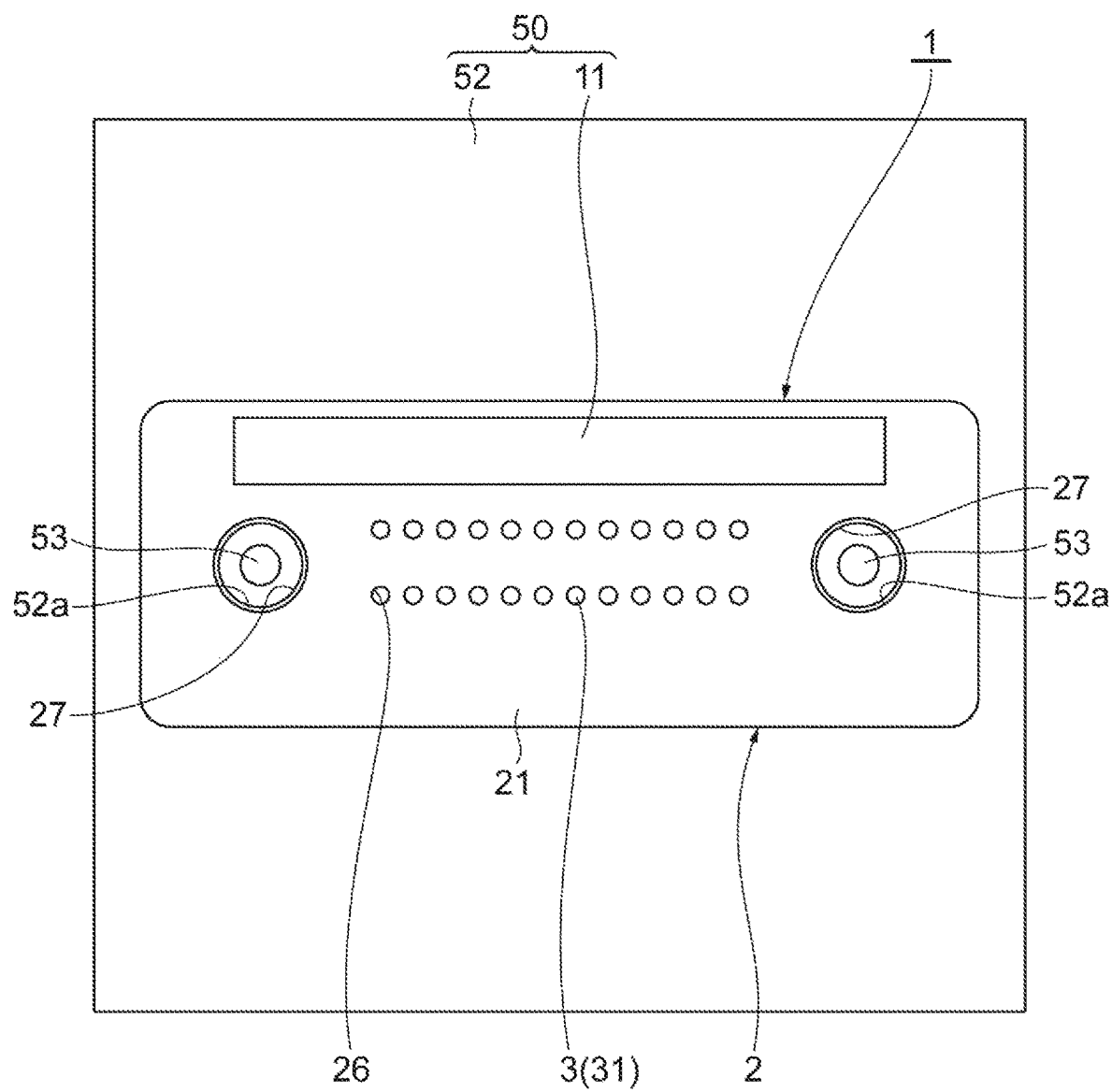
FIG. 9 is a plan view showing a layered film and an optical connector according to a second embodiment.
Figure 10:
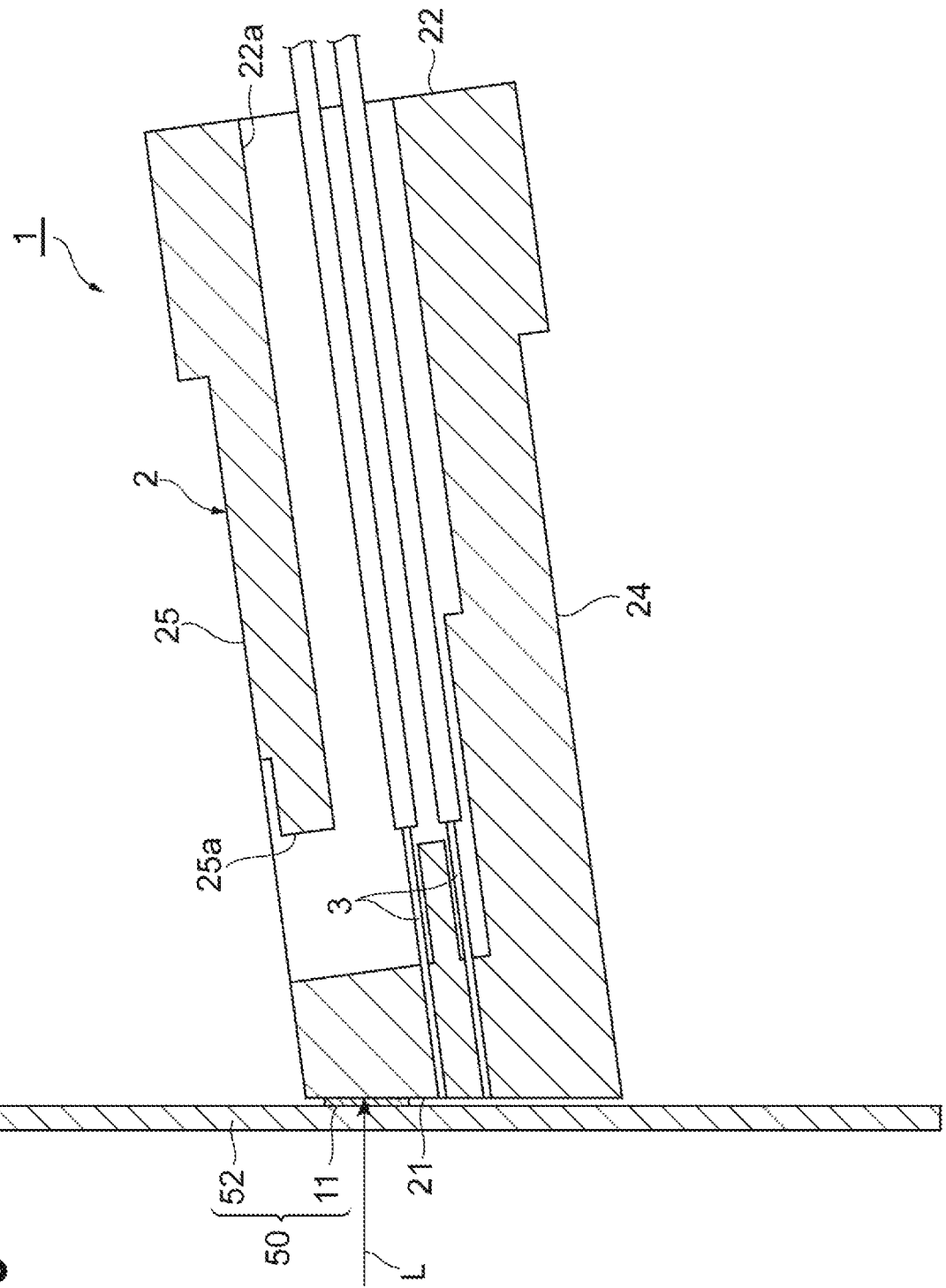
FIG. 10 is a cross-sectional side view showing the layered film and the optical connector in FIG. 9.

Next, referring to FIGS. 9 and 10, an optical connector according to a second embodiment the will be described. FIG. 9 is a diagram of a ferrule 2 and a layered film 50 viewed from above. FIG. 10 is a cross-sectional side view showing the ferrule 2 and the layered film 50. In the following description, the duplicate description of the first embodiment is appropriately omitted.

The second embodiment is different from the first embodiment in that the size and the shape of an adhesive film 52 of the layered film 50 are different and the jig 40 described above is not used in the step of positioning. The ferrule 2 has a plurality of guide holes 27 into which a guide pin 53 is inserted. The adhesive film 52 is made of a material different from the material of the ferrule 2. The adhesive film 52 is made of PET, for example. The adhesive film 52 has a through hole 52a, into which the guide pin 53 is inserted, as a positioning shape. Note that the positioning shape of the adhesive film 52 is not limited to the through hole 52a, which is appropriately changeable. In the second embodiment, the guide pins 53 of the ferrule 2 are inserted into the through holes 52a, and the layered film 50 is positioned to the ferrule 2.

A method for manufacturing the optical connector 1 using the layered film 50 will be described. The method is similar to the first embodiment from the initial state to the step of polishing. That is, a surface protective film 13 is removed, one sheet of the layered film 50 is cut, optical fibers 3 are fixed to optical fiber retention holes 26 of the ferrule 2, and an end face 21 of the ferrule 2 and tip end faces 31 of the optical fibers 3 are polished.

After the polishing is performed, the guide pins 53 are inserted into the guide holes 27 of the ferrule 2. After that, one sheet of the layered film 50 is attached to the end face 21 of the ferrule 2. At this time, a spacer film 11 of the layered film 50 is brought into contact with the end face 21, and the adhesive film 52 is positioned to the end face 21. More specifically, positioning is performed using the guide pins 53 of the ferrule 2 and the shape of the adhesive film 52, and the guide pins 53 are inserted into the through holes 52a of the adhesive film 52, for example, for positioning (the step of positioning). After positioning is performed, a laser light beam L is applied to weld the spacer film 11 and the end face 21 to each other, and after welding, the adhesive film 52 is removed from the spacer film 11 (the step of removing). After the end face 21 and the tip end face 31 are AR-coated, a series of steps is completed.

In the method for manufacturing an optical connector according to the second embodiment, the ferrule 2 has the plurality of guide holes 27 into which the guide pins 53 are inserted. In the step of positioning, positioning is performed using the plurality of guide pins 53 that is individually inserted into the plurality of guide holes 27 and the shape of the adhesive film 52. Consequently, the adhesive film 52 is fit to the guide pins 53 that are inserted the guide holes 27, and thus positioning the adhesive film 52 can be performed. Therefore, the layered film 50 can be highly accurately positioned without using the jig 40 described above.

As described above, the method for manufacturing an optical connector according to the embodiments is described. However, the method for manufacturing an optical connector according to the present disclosure can be variously modified, non-limiting to the embodiments. The configurations of the components of the optical connector and the content and order of the steps of the method for manufacturing an optical connector are appropriately changeable within the scope of the gist of claims.

For example, in the foregoing embodiments, an example is described in which the end face 21 of the ferrule 2 and the tip end face 31 of the optical fiber 3 are AR-coated. However, for example, in the case where the end face of the ferrule and the tip end face of the optical fiber are inclined to a plane orthogonal to the optical axis of the optical fiber, AR coating may be omitted.

In the foregoing embodiments, an example is described in which the entire surface of the spacer film 11 is welded to the end face 21 of the ferrule 2. However, a non-welded part may be formed on the spacer film 11. In the case where the spacer film that is welded has a positioning shape using the guide pin, the part of the spacer film that contacts the guide hole 27 is possibly a non-welded part. Since force in the direction in which the spacer film is ripped off due to cleaning, for example, is easily applied to the non-welded part, the non-welded part is prone to be a starting point from which a peel in the spacer film expands. Like the foregoing embodiments, in the case where the spacer film that is welded has no positioning shape, the non-welded part can be provided on the part of the end face 21 that is not the end part like the part in contact with the guide hole 27, and thus a turn-up and a peel in the spacer film 11 can be suppressed.

In the foregoing embodiments, the jig 40 including the pin 41, the retaining unit 42, and the glass plate 43 is described. However, the configurations of the components of the jig are appropriately changeable. Moreover, in the foregoing embodiments, the layered film 10 is described which includes the spacer film 11 and the adhesive film 12 and which is covered with the surface protective film 13 in the initial state. However, the number, thickness, shape, disposition form, and material of the films that constitute the layered film are appropriately changeable.

REFERENCE SIGNS LIST 1 optical connector
2 ferrule
3 optical fiber
10, 50 layered film
11 spacer film
12, 52 adhesive film
12a, 52a through hole
13 surface protective film
14 perforation
21 end face
22 rear end face
22a inlet port
23 side face
24 bottom face
25 top face
25a hole part
26 optical fiber retention hole
27 guide hole
31 tip end face
40 jig
41 pin
42 retaining unit
43 glass plate
53 guide pin
C center axis
D1 connection direction
D2, D3 direction
L laser light beam

The invention claimed is:

1. A method for manufacturing an optical connector including a ferrule configured to retain a plurality of optical fibers, the method comprising the steps of:
    exposing tip end faces of the plurality of optical fibers to an end face of the ferrule to fix the plurality of optical fibers to the ferrule;
    polishing the end face together with the tip end faces;
    positioning a first film having a material different from a material of the ferrule to the end face in a layered film having a plurality of films, the positioning being performed using a pin provided on a jig that retains the ferrule and inserting the pin into a through hole of the first film; and
    welding a second film containing a material equal to the material of the ferrule to the end face in the layered film.

2. The method for manufacturing an optical connector according to claim 1, comprising the steps of:
    removing the first film from the second film after the step of welding; and
    AR-coating the end face and the tip end face.

3. The method for manufacturing an optical connector according to claim 1, wherein
    the first film is an adhesive film having an adhesion property on a surface on a side where the second film is located.

4. A method for manufacturing an optical connector including a ferrule configured to retain a plurality of optical fibers, the method comprising the steps of:
    exposing tip end faces of the plurality of optical fibers to an end face of the ferrule to fix the plurality of optical fibers to the ferrule;
    polishing the end face together with the tip end faces;
    positioning a first film having a material different from a material of the ferrule to the end face in a layered film having a plurality of films, wherein the ferrule has a plurality of guide holes into which a plurality of guide pins is inserted, and the positioning is performed by inserting the plurality of the guide pins into the plurality of guide holes and inserting the guide pins into through holes in the first film; and
    welding a second film containing a material equal to the material of the ferrule to the end face in the layered film.

* * * * *